(12) United States Patent
Thompson (10) Patent No.: US 8,439,296 B2
(45) Date of Patent: May 14, 2013

(54) AIRCRAFT HUFFER COUPLING ADAPTER AND METHODS OF USE

(76) Inventor: Kevin Michael Thompson, Chandler, AZ (US)

( * ) Notice: Subject to any disclaimer, the term of this patent is extended or adjusted under 35 U.S.C. 154(b) by 408 days.

(21) Appl. No.: 12/688,109

(22) Filed: Jan. 15, 2010

(65) Prior Publication Data

US 2011/0175350 A1        Jul. 21, 2011

(51) Int. Cl.
    *B64D 33/00*        (2006.01)
(52) U.S. Cl.
    USPC ................. 244/53 B; 244/131; 141/382
(58) Field of Classification Search .......... 244/1 R, 244/53 B, 53 A, 131; 141/382, 383, 384, 141/385, 386
    See application file for complete search history.

(56) References Cited

U.S. PATENT DOCUMENTS

| | | | |
|---|---|---|---|
| 3,330,313 A * | 7/1967 | Rosell | 141/384 |
| 5,355,917 A * | 10/1994 | Kofflin | 141/384 |
| 5,740,846 A * | 4/1998 | Larson et al. | 141/382 |
| 5,927,355 A * | 7/1999 | Kofflin | 141/383 |
| 6,116,300 A * | 9/2000 | Kofflin | 141/382 |
| 6,289,949 B1 * | 9/2001 | Shumaker et al. | 141/383 |
| 7,152,886 B2 * | 12/2006 | Janis et al. | 285/311 |
| 7,984,930 B2 * | 7/2011 | Janis et al. | 285/312 |
| 8,016,325 B2 * | 9/2011 | Gosis et al. | 285/236 |
| 8,146,957 B2 * | 4/2012 | Janis et al. | 285/312 |
| 8,146,958 B2 * | 4/2012 | Janis et al. | 285/312 |

* cited by examiner

*Primary Examiner* — Benjamin P Lee
(74) *Attorney, Agent, or Firm* — Booth Udall Fuller PLC (57) ABSTRACT

An aircraft huffer coupling adapter comprises a flange assembly having one or more attachment members in communication with a flange ring via one or more strut members. The flange assembly is attached with a port end of an inner coupling of a huffer coupling via the one or more attachment members. The flange ring defines an inner diameter larger than an outer diameter of the huffer coupling, with at least one space between an inner wall of the flange ring and the outer diameter of the air hose coupling arranged to allow airflow therethrough.

8 Claims, 9 Drawing Sheets

AIRCRAFT HUFFER COUPLING ADAPTER AND METHODS OF USE

BACKGROUND

1. Technical Field

Aspects of the present document relate generally to aircraft huffer coupling adapters and methods of use, and more specifically to using one or more aircraft huffer coupling adapters to provide conditioned air to one or more aircraft pack bay intake valves and/or to assist in avoiding one or more flight delays resulting at least from one or more aircraft excessive heat conditions and/or alerts.

2. Background Art

Commercial air travel provides tremendous benefits to business travelers, vacationers, leisure travelers, and others who wish to reach their destination quickly. Nevertheless, for commercial airlines and their employees, providing timely airline travel for customers is not without its operational challenges.

Airlines may typically use a single aircraft to fly multiple routes between two or more cities. Successive take-offs and landings for a single aircraft may occur on the same day, and/or on one or more different days. Commercial aircraft generally undergo various pre-flight and/or post-flight checks and routines to in order to assure the continued airworthiness of one or more particular aircraft. Notwithstanding, one or more malfunctions, alerts, error messages and/or other undesired conditions may occur from time to time that may make a successive take-off for an aircraft unsafe, unlawful and/or unwise. Commercial airlines may experience considerable expense and airline passengers and/or personnel may experience significant inconvenience when one or more aircraft are not cleared for a takeoff due to one or more malfunctions, alerts, error messages and/or other undesired conditions. Various attempts have been made to ameliorate excessive heat conditions in landed jet aircraft.

SUMMARY

Aspects of this document relate to aircraft huffer coupling adapters and methods of use.

In one aspect, an aircraft huffer coupling adapter assembly comprises a flange assembly having one or more attachment members in communication with a flange ring via one or more strut members. The flange assembly is attached with a port end of an inner coupling of a huffer coupling via the one or more attachment members. The flange ring defines an inner diameter larger than an outer diameter of the huffer coupling such that at least one space exists between an inner wall of the flange ring and the outer diameter of the huffer coupling, the space being arranged to allow airflow therethrough.

Particular implementations may include one or more of the following. At least one of the one or more attachment members of the flange assembly may comprise an inside wall having one or more mating structures configured to releasably mate with the port end of the huffer coupling such that the flange assembly is held in place with respect to the huffer coupling. One or more mating structures on the inside wall of the attachment member may comprise one or more threads configured to releasably mate with one or more external threads on the port end of the huffer coupling. At least one attachment member may further comprise a cap member configured to at least partially block airflow from entering the huffer coupling through the port end. An end cap may be releasably mateable with the port end of the huffer coupling and may be configured to at least partially block airflow from entering the huffer coupling through the port end, and the end cap may be in mechanical communication with the one or more attachment members such that the flange assembly is held in place with respect to the huffer coupling when the end cap is mated with the port end. The flange assembly may further comprise one or more baffles configured to deflect airflow. A secondary flange assembly may be attached with the huffer coupling, the secondary flange assembly including at least one secondary attachment member in communication with at least one secondary ring having an outside diameter smaller than the inside diameter of the flange ring. A distal end of a ground air hose may be attached to the flange ring such that the distal end of the air hose is held in place with respect to the flange ring. The flange ring may be positionable with respect to the huffer coupling. A portion of the huffer coupling may extend beyond a top edge of the flange ring. The huffer coupling may be oriented concentrically with respect to the flange ring.

In another aspect, a method of adapting an aircraft huffer coupling for attachment with a ground air hose comprises attaching a flange assembly with a port end of an inner coupling of an aircraft huffer coupling via at least one attachment member, attaching a ground air hose with a flange ring of the flange assembly, attaching the huffer coupling with a huffer fitting on a jet aircraft, providing conditioned airflow to the ground air hose via one or more air conditioning units, and allowing airflow through at least one space between an inner diameter of the flange ring and an outer diameter of the huffer coupling.

Particular implementations may include one or more of the following. Attaching a flange assembly with a port end of an inner coupling may comprise releasably mating one or more mating structures on an inside wall of the one or more the attachment members with one or more mating structures on the port end of the huffer coupling. Attaching a flange assembly with a port end of an inner coupling may comprise releasably mating an end cap with one or more mating structures on the port end of the huffer coupling such that the end cap is in mechanical communication with one or more attachment members, and the flange assembly is held in place with respect to the huffer coupling. At least partially blocking airflow from entering the huffer coupling through the port end may be provided via one or more cap members and/or end caps.

Deflecting airflow may be accomplished with one or more baffles. Positioning the flange ring with respect to the huffer coupling may be accomplished in various ways.

In yet another aspect, a method of adapting an aircraft huffer coupling adapter assembly to assist in preventing at least one excessive heat condition in at least one jet aircraft comprises attaching a flange assembly with a port end of an inner coupling of an aircraft air hose coupling via at least one attachment member, attaching a ground air hose with a flange ring of the flange assembly, attaching the huffer coupling with a huffer air hose fitting on a jet aircraft, providing conditioned airflow to the ground air hose from one or more air conditioning units, allowing conditioned airflow through at least one space between an inner diameter of the flange ring and an outer diameter of the huffer coupling, providing conditioned airflow to one or more pack bays.

Particular implementations may include one or more of the following. Providing airflow to one or more pack bays may further comprise ameliorating one or more excessive heat conditions. Ameliorating at least one excessive heat condition may further comprises one of preventing one or more alerts and dismissing one or more alerts. Providing conditioned airflow to one or more pack bays may occur before one or more alerts occur.

The foregoing and other aspects, features, and advantages will be apparent to those having ordinary skill in the art from the DESCRIPTION and DRAWINGS, and from the CLAIMS.

BRIEF DESCRIPTION OF THE DRAWINGS

Various particular implementations of aircraft huffer coupling adapters and Associated methods of use will hereinafter be described in conjunction with the appended drawings, where like designations denote like elements, and.

DESCRIPTION

This disclosure, its aspects and implementations, are not limited to the specific assemblies, devices, components and/or methods of operation disclosed herein. Many additional assemblies, devices, components and/or methods of operation consistent with the intended operation of an aircraft huffer coupling adapter and/or methods of using an aircraft huffer coupling adapter will become apparent from these disclosures.

Accordingly, for example, although particular aircraft huffer coupling adapters, aircraft huffer couplings, outer couplings, inner couplings, attachment ends, port ends, outer diameters, flange assemblies, attachment members, flange rings, strut members, inner diameters, cap members, end caps, spaces, secondary flange assemblies, secondary attachment members, secondary rings, huffer hoses, ground air hoses, ground air connections, air conditioning units, through passageways, baffles, airflows, huffer coupling fittings, aircraft surfaces, pack bays, pack bay components, pack bay air intake valves, excessive heat conditions, alerts, jet aircraft, and other systems, components, aspects and/or features are disclosed, such particular aircraft huffer coupling adapters, aircraft huffer hose couplings, outer couplings, inner couplings, attachment ends, port ends, outer diameters, flange assemblies, attachment members, flange rings, strut members, inner diameters, cap members, end caps, spaces, secondary flange assemblies, secondary attachment members, secondary rings, huffer hoses, ground air hoses, ground air connections, air conditioning units, through passageways, baffles, airflows, huffer coupling fittings, aircraft surfaces, pack bays, pack bay components, pack bay air intake valves, excessive heat conditions, alerts, jet aircraft, and implementing components, may comprise any style, type, configuration, model, version and/or the like of any assembly, device, component, hardware and/or apparatus that is known in the art for such aircraft hose coupling adapters, consistent with the intended operation of a method of operating such aircraft huffer coupling adapters.

Figure 1:
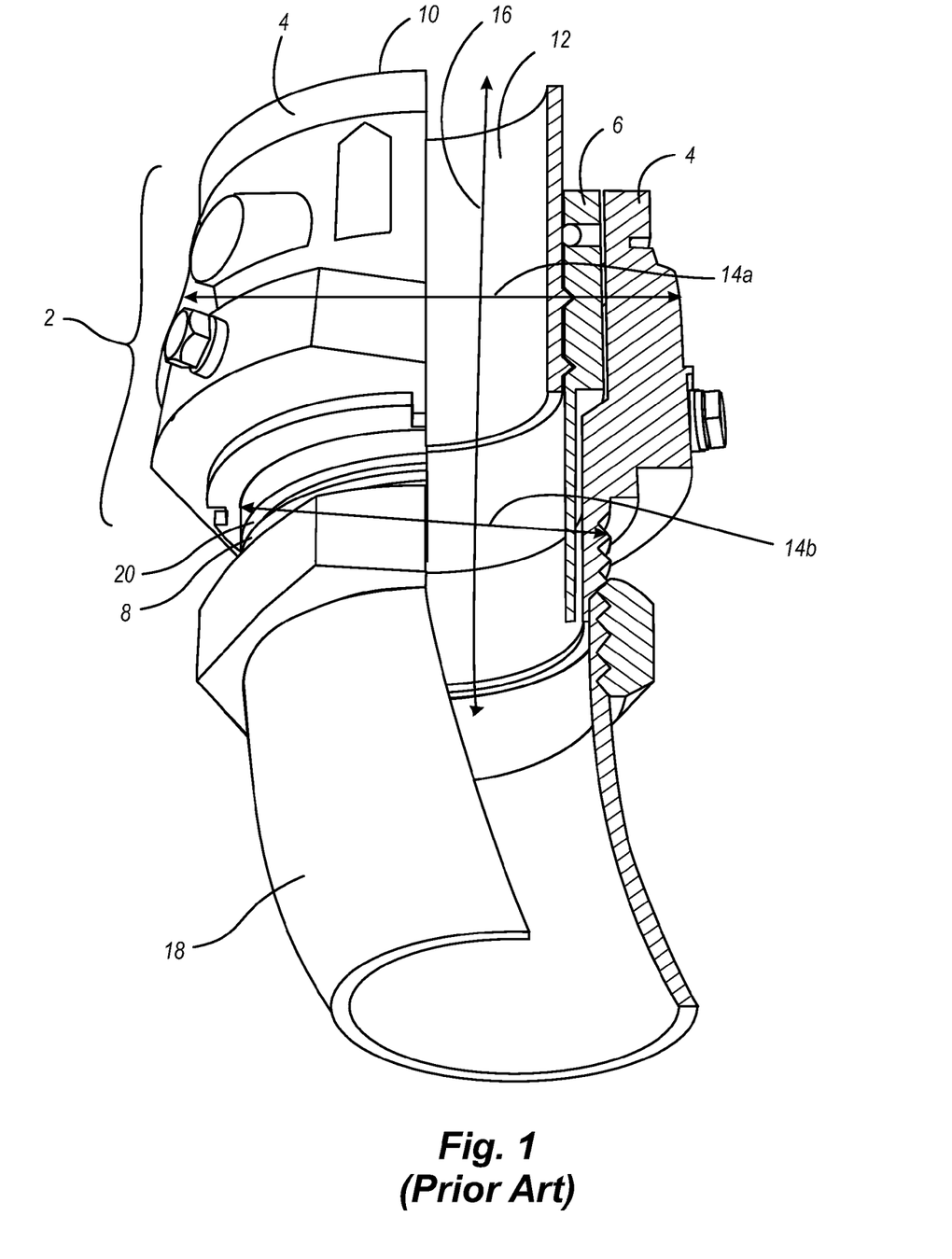
FIG. 1 illustrates a perspective cut-away view of a prior art aircraft huffer coupling and aircraft huffer fitting.

FIG. 1 illustrates a particular prior art aircraft huffer coupling and huffer fitting. A prior art huffer coupling 2 is configured for attachment to an aircraft huffer fitting 12 and includes at least an outer coupling 4 and an inner coupling 6. It will be understood that, as used herein, a "huffer fitting" is intended to encompass a fitting used with respect to an aircraft "huffer" connection or "bleed line," e.g. a fitting that is used to provide airflow from one or more "huffer units" to start one or more jet engines. When the outer coupling 4 is moved downward (e.g. towards a port end 8 and/or away from an aircraft having a huffer fitting), the attachment end 10 of the inner coupling 6 is free to releasably engage with an aircraft huffer fitting 12.

When the outer coupling 4 is moved upward (e.g. toward the attachment end 10), the inner coupling 6 may become "locked" in place with respect to the huffer fitting 12 by at least a portion of the inner coupling 6 (e.g. the attachment end 10 of the coupling 2) becoming wedged between the huffer fitting 12 and the outer coupling 4. It will be understood that when the huffer coupling 2 is not coupled with an air hose fitting, the inner coupling 6 may be rotatable with respect to the outer coupling 4.

The port end 8 of the huffer coupling 2 is configured for attachment to one or more huffer hoses 18 via one or more mating structures 20 (which may include external threads). Huffer hoses may generally have a diameter corresponding to about the diameter of the port end 8, and are designed to conduct air under considerable pressure from one or more huffer units (devices that provide airflow for the purpose of starting one or more jet engines) to the huffer coupling 2.

A huffer coupling 2 includes at least one outer diameter, such as outer diameter 14a (taken across the attachment end 10, and which may be about 4.75 inches (about 11.9 cm) in some particular implementations), and/or outer diameter 14b (taken across the port end 8, and which may be about 3.75 inches (about 9.4 cm) in some particular implementations). In addition, a huffer coupling 2 includes at least one through passageway 16 connecting the port end 8 with the attachment end 10, and configured to allow at least some airflow therethrough (a butterfly and/or other airflow valve may be provided).

Figure 2:
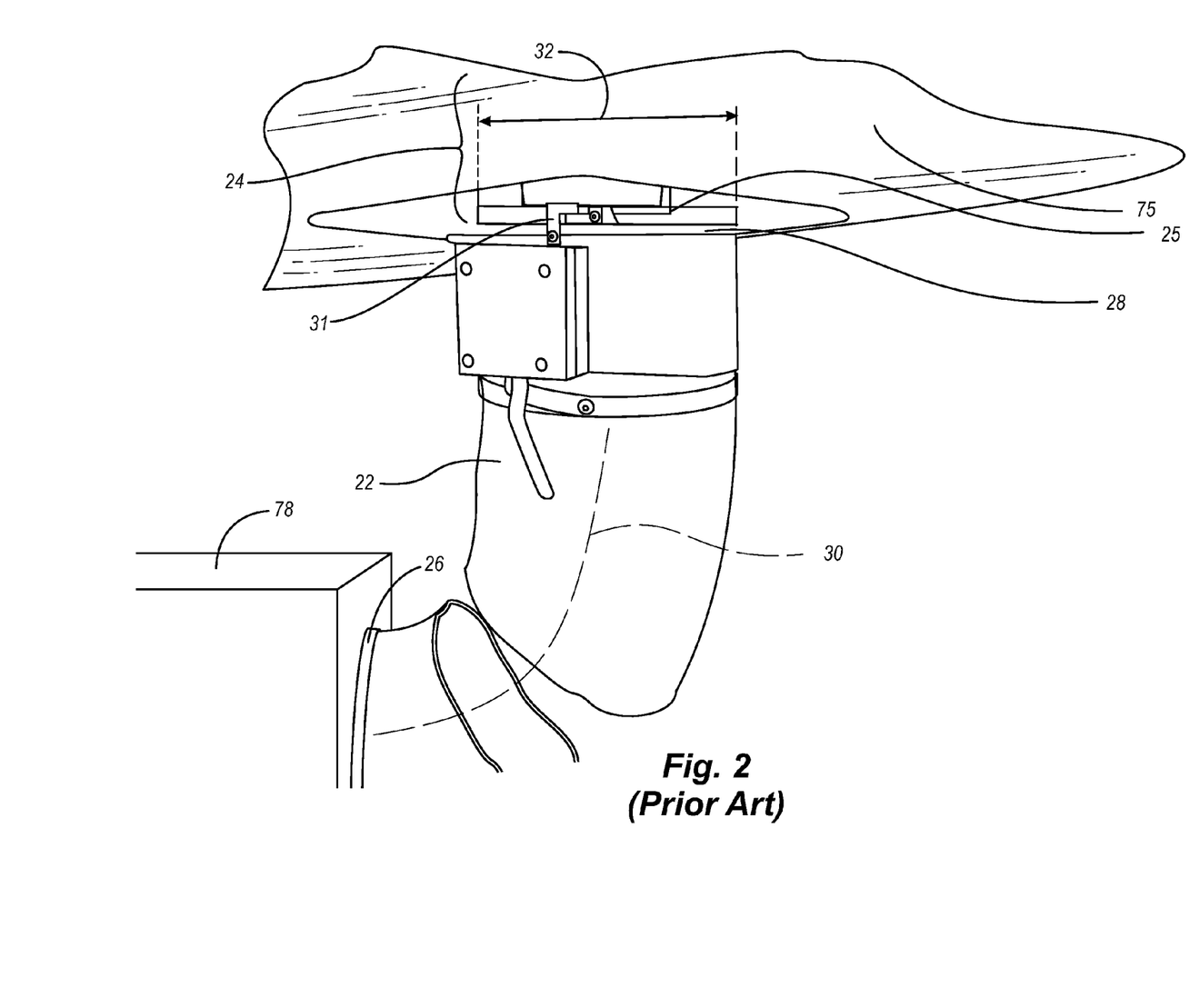
FIG. 2 illustrates a perspective view of a prior art ground air hose configured for attachment to an aircraft ground air duct.

Turning now to FIG. 2, a prior art aircraft ground air hose 22 configured for attachment to an aircraft ground air duct 24 and an air conditioning unit 78 (via appropriate connection hardware at opposing ends of the hose) is illustrated. The ground air hose 22 includes at least a proximal end 26 and a distal end 28 (shown best in FIG. 9). The at least two ends are connected by a through passageway 30 having at least one internal diameter 32 (which may be about 7.5 inches (about 18.75 cm) across and which, in any event, corresponds to the diameter of the aircraft duct 24 and/or duct ring 25). The distal end 28 may include appropriate connection hardware and may be attached to an aircraft air duct 24 such as via one or more connectors 31 (one or more connectors 31 may likewise be used to attach the distal end 28 of the ground air hose 22 to one or more flange rings 40, as shown and described further herein).

The proximal end 26 of the ground air hose 22 may include appropriate connection hardware to allow attachment with one or more air conditioning units 78 (FIG. 7) designed to provide conditioned airflow at a positive pressure to the ground air hose 22 via the through passageway 30.

Notwithstanding the foregoing, there are a variety of particular implementations of aircraft huffer coupling adapters shown and described herein with respect to FIGS. 3-9.

Figure 3:
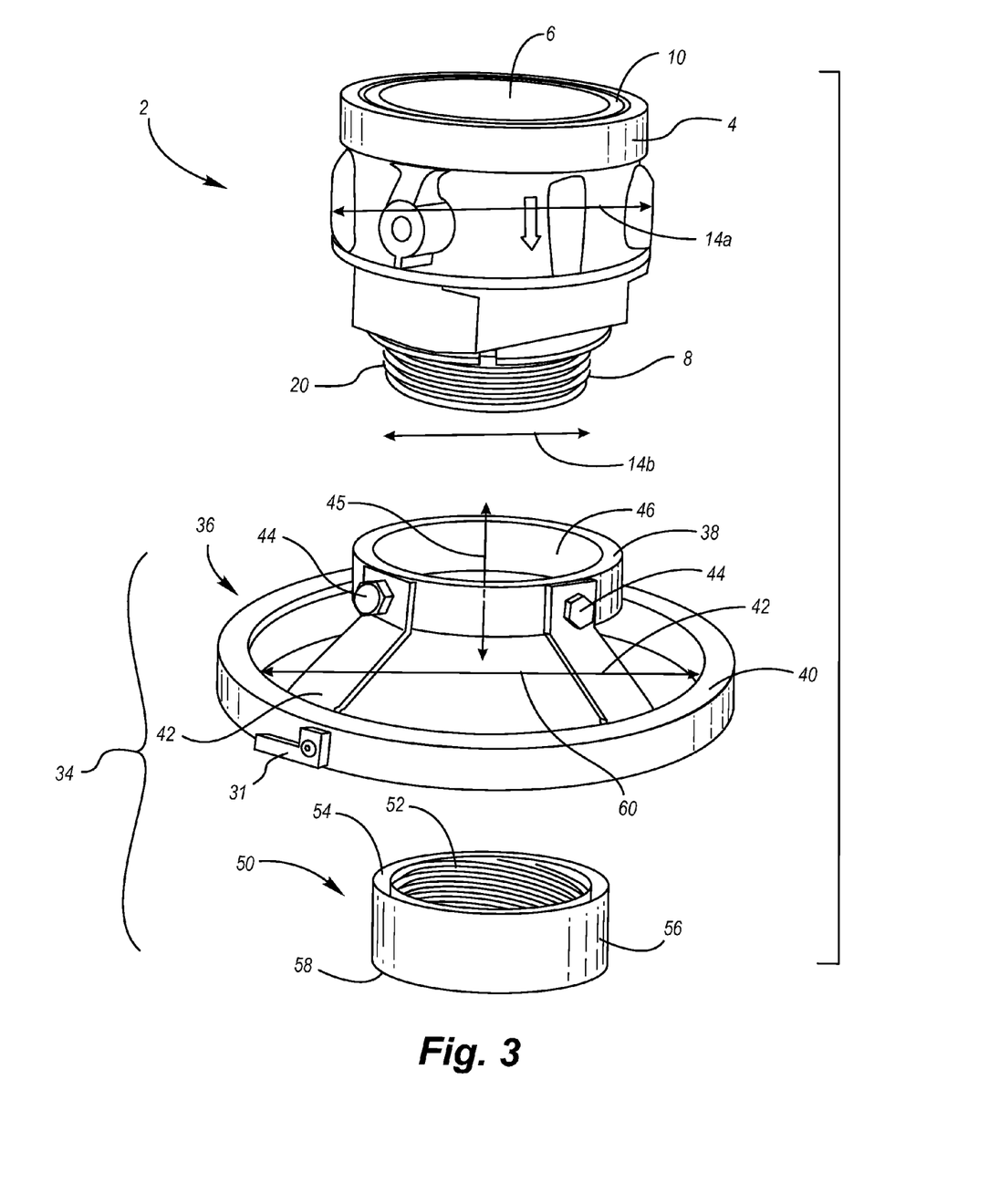
FIG. 3 illustrates a disassembled view of a particular implementation of an aircraft huffer coupling adapter.
Figure 4:
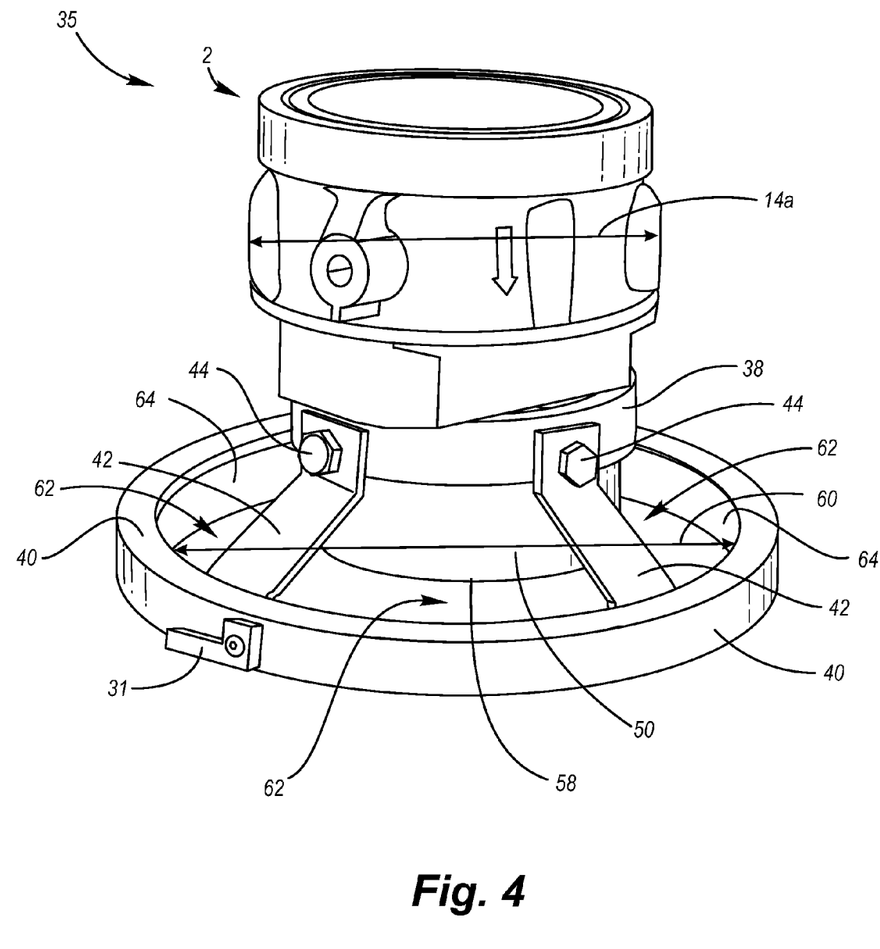
FIG. 4 illustrates an assembled perspective view of an adapted huffer coupling.

FIGS. 3 and 4 specifically illustrate various aspects and features of a particular implementation of an aircraft huffer coupling adapter. As described further herein, an aircraft huffer coupling adapter 34 (and/or any other particular implementation of aircraft huffer coupling adapter disclosed herein) may be used at least to assist in adapting a huffer coupling 2 to allow connection thereto of one or more ground air hoses 22 (and/or other hoses of larger and/or unequal diameter). Specifically, a huffer coupling adapter 34 (and/or any other particular implementation of huffer coupling adapter disclosed herein) may be used at least to assist adapting one or more huffer couplings 2 with one or more flange assemblies described herein in order to in provide conditioned airflow to one or more jet aircraft pack bays 80 via one or more ground air hoses 22, thereby assisting in avoiding, ameliorating and/or improving one or more excessive heat conditions, faults, alerts, and/or other undesired conditions.

While the examples described herein discuss cooled air and are discussed within the context of assisting in preventing one or more excessive heat conditions and/or alerts, it is nevertheless specifically contemplated that the devices and methods described herein may likewise be used to avoid one or more "excessive cold conditions" and/or alerts, and that "conditioned air" may therefore likewise encompass heated as well as cooled air and that any "air conditioning unit" disclosed herein may variously encompass both a heater capable of providing heated airflow and/or an air conditioner capable of providing cooled airflow.

Commercial jet aircraft typically include various internal systems and/or components designed at least for power generation, internal cabin pressurization, internal climate control, passenger entertainment and/or catering, aircraft navigation, aircraft landing and/or other aspects relating to aircraft safety and/or comfort. The various systems and components included in modern jet aircraft may be located throughout an aircraft and or may be aggregated in a single location and/or compartment within the aircraft such as, by way of non-limiting example, one or more aircraft pack bays 80. One or more aircraft pack bays (FIG. 9) may at least partially enclose various components (collectively "pack bay components" 82a-82n) such as one or more air cyclers configured to separate hot air from cold air, one or more air conditioning condensers, one or more air conditioning water separators (driers), one or more heaters, and/or other equipment and/or components relating to the internal climate control of one or more interior cabins of an aircraft (such as the cockpit, forward cabin, aft cabin, etc.). One or more pack bays 80 may likewise at least partially enclose one or more fuel lines and/or tanks (such as a center fuel tank, not shown), one or more pack bay ducts that channel airflow therethrough (not shown), and/or other equipment and/or components.

One or more pack bay components 82a-82n (FIG. 9) may operate when one or more aircraft engines and/or auxiliary power units ("APU"s) are operating (and/or under other conditions). The one or more pack bay components may actively and/or passively process ambient air in the proximity of the one or more components. Accordingly, when ambient temperatures outside and/or inside an aircraft are hot, one or more pack bay components may accordingly process hot air. There may exist considerable demands upon one or more pack bay components to cool down ambient air to a comfortable temperature before providing it to one or more aircraft cabins, especially where the ambient air is hot to begin with (e.g. above about 32° Celsius, or about 90° Fahrenheit). The demands may be especially strenuous in those locations where temperatures on a tarmac have exceeded about 40° Celsius, or about 100° Fahrenheit.

Significantly, the many systems and components that make comfortable jet aircraft travel possible may themselves have large power requirements and/or may produce significant waste heat during the course of their intended operation. The waste heat generated by an aircraft's various internal systems and/or components (and even passengers themselves) may be of little consequence when an aircraft is in-flight, where air temperatures may reach well below 0° Celsius (32° Fahrenheit), and excessive heat build-up is not ordinarily a concern. Notwithstanding, as described further herein, excessive waste heat accumulation (especially in conjunction with high outside air temperatures) may have significant consequences after an aircraft has landed on the ground, especially in locales with hot weather conditions.

By way of non-limiting example, once a jet aircraft has landed on the ground after a flight, the aircraft may experience one or more excessive heat conditions, faults, malfunctions, anomalies and/or "alerts," as described further below. Such excessive heat conditions, faults, malfunctions, anomalies and/or alerts, may be detected and/or indicated by one or more sensors and/or displays in one or more internal and/or external areas of the aircraft. One or more sensors may include, by way of non-limiting example, one or more sensors implemented as part of a "fire loop" heat-detection system known in the art and having two or more tracks or loops (such as an "a loop" and a "b" loop) running in one or more areas of an aircraft, such as inside one or more pack bays 80. Various displays are likewise disclosed herein.

As noted above, one or more "excessive heat conditions" may be more likely to occur when the outside air temperature ("O.A.T.") on the ground is hot (e.g. above about 32° Celsius, or about 90° Fahrenheit). As used herein, the phrase "excessive heat condition" is intended to broadly encompass at least those conditions where one or more aircraft and/or aircraft systems experiences one or more technical malfunctions, technical anomalies and/or alerts. As used here in the terms "alert" and/or "alerts" are intended to encompass at least one or more "master caution faults," "nuisance messages," "upper Electronic Centralized Aircraft Monitor" ("ECAM") indications (such as an amber colored indication), "lower 'ecam'" indications (such as an amber colored indication), "class1 warnings," "class 2 warnings," "pack faults," excessive heat faults, outside air temperature (O.A.T.) messages, pack bay heat conditions, "hot fuel" conditions, "Engine Indicating and Crew Alerting System" ("EICAS") alerts, "pack trips" and/or any other undesired condition with respect to the aircraft and/or one or more aircraft systems, fluids, and/or components due to excess internal heat accumulation and/or high outside air temperature.

It will be understood that one or more alerts may be sent to one or more flight warning computers, displays and/or other hardware known in the art for use with aircraft alerting systems, along with appropriate software and/or user interfaces configured to receive, store, and or communicate one or more alerts.

It will be appreciated that an aircraft on the ground that has experienced one or more excessive heat conditions and/or one or more related malfunctions, anomalies, alerts, and/or any other undesired condition as a result of excess heat build-up, may not be allowed to take off until the one or more conditions are corrected. Such undesirable prohibition on takeoff may occur as a result of one or more rules and/or regulations, one or more operating procedures (such as those set forth by an airline, aircraft manufacturer, insurance carrier, employee union and/or the like), and/or based upon the discretion of one or more individuals.

As airlines face increasing pressures to increase their efficiency and/or profitability, the "quick-turn" and/or the "star flight" have taken on increased significance for airlines. A "quick-turn" describes at least a situation where a particular aircraft may land at a particular airport and the aircraft is prepared to quickly return to the air during a subsequent take-off (re-takeoff) from that same airport. "Star flights" describe at least where a single aircraft is used to transport passengers to and from various airports in a single day. In either (or both) case, an aircraft may undergo various activities during its time on the ground, such as off-loading passengers and/or luggage, boarding new and/or returning passengers and/or luggage, re-fueling, cleaning, heating and/or cooling one or more interior portions of the aircraft, and/or any other activity required and/or desired to prepare the aircraft for re-takeoff.

As noted above, an aircraft may not typically be cleared for a quick-turn take-off, or for any takeoff at all, when one or more excess heat conditions and/or alerts are indicated. Not surprisingly, when an aircraft cannot be prepared for a planned quick-turn and/or take-off in a timely manner due to one or more excess internal heat conditions, the airline (or airlines) operating the aircraft may experience considerable financial and/or other consequences, which may include at least wasted fuel to run APUs and/or main engines, airport charges and fees, "lost" employee wages, missed passenger connections, additional cancelled and/or delayed flights, negative impact upon customer good-will, increased logistical challenges, and/or additional tangible and/or intangible consequences.

Accordingly, as described further herein, a huffer coupling adapter and associated methods of use according to the present teachings may be especially valuable to commercial airlines and/or other users responsible for ensuring efficient quick-turns and other takeoffs for jet aircraft.

As illustrated by FIGS. 3 and 4, a particular implementation of an aircraft huffer coupling adapter 34 includes a flange assembly 36 having at least one attachment member 38 in communication with at least one flange ring 40 via one or more strut members 42. A huffer adapter 34 may further include an end cap 50, described further below.

As illustrated by FIG. 4, an attachment member 38 of the flange assembly 36 may be coupled and/or attached with a huffer coupling 2, in particular, a port end 8 of the inner coupling 6. [Notwithstanding, it is specifically contemplated that in some particular implementations, an attachment member may not be attached to a huffer coupling 2 at all, but may be laterally elongated on one or more sides such as to allow the attachment member to be inserted into a hatchway 77 in the belly of an aircraft 75 with at least a portion of the attachment member in contact with at least a portion of the inside belly 79 (FIG. 7) of an aircraft, such that the particular implementation of flange assembly is suspended therefrom and/or held in place with respect thereto.]

Depending upon the particular implementation, one or more attachment members 38, one or more flange rings 40 and/or one or more strut members 42 (and/or even one or more end caps and or cap portions) may be attached with one another via one or more fasteners 44 and/or may be integrally formed together, depending upon the particular implementation).

As used herein throughout, the terms "attached," "attachment," "attaching," and/or "coupled" are intended to encompass at least those instances where one or more components disclosed herein are removably or permanently attached and/or coupled to one or more other components disclosed herein. Accordingly, one or more fasteners 44 may comprise any fastener known in the art for removably and/or permanently coupling one or more components to one or more other components such as, by way of non-limiting example, one or more screws, bolts, pins, rods, rivets, welds, clamps, pivots, and/or any other fastener known in the art.

In the particular implementation shown, a flange assembly 36 may be attached with a huffer coupling 2 by placing an attachment member 38 of the flange assembly 36 in communication with the port end 8 of the huffer coupling 2 and holding the flange assembly 36 in place with respect to the huffer coupling 2 (such as via one or more mating structures, end caps and/or fasteners, consistent with these disclosures). In some particular implementations, such as the one shown, an attachment member 38 may comprise a generally band-like, cuff-like, and/or a sleeve-like type arrangement having a through opening 45. Depending upon the particular implementation, the attachment member 38 and/or a through opening 45 may be defined by a continuous or con-continuous inside wall 46 and/or may be comprised by one or more elements that combine to form a through opening 45.

As will be appreciated from a comparison of FIG. 3 to FIG. 4, an attachment member 38 may be held in place by one or more end caps 50, such that the flange assembly 36 is held in place with respect to the huffer coupling 2. As used herein, the term "held in place" refers to where a flange assembly 36 (and/or one or more attachment members, one or more strut members and/or one or more flange rings) are attached with a huffer coupling 2. Held in place may therefore variously encompass those particular implementations where a flange assembly (and/or one or more components defining a flange assembly) is fixed with respect to a huffer coupling 2 and/or where one or more components defining the flange assembly are pivotable, rotatable, flexible, and/or otherwise positionable with respect to a huffer coupling 2.

"Held in place" may further include, as used herein, those instances where a flange assembly 36 (and/or any other flange assembly disclosed herein) is held in place sufficiently securely with respect to a huffer coupling 2 that the flange assembly 36 (including one or more attachment members, strut members, flange rings and/or other components and/or fasteners) can support a ground air hose 22 and/or associated connectors, hardware, etc. therefrom when the huffer coupling 2 is coupled with a huffer fitting 12 and the flange ring 40 is attached to the ground air hose 22. Specifically, it will be understood that a huffer fitting 12 may typically be located over one or more users' heads. Therefore, a ground air hose 22 (which may weigh a considerable amount) may be securely suspended without readily falling down from a flange ring 40 with a flange assembly 36 attached to a huffer coupling 2 and with the huffer coupling 2 coupled to a huffer fitting 12.

By providing configurability and positionability of the various particular implementations of flange rings and/or attachment members and/or strut members disclosed herein, users may be able to configure a flange assembly (such as flange assembly 36 and/or any other flange assembly disclosed herein), according to the needs of the user and/or the demands of a particular application (explained further with respect to FIG. 8).

Still referring to FIGS. 3 and 4, an end cap 50 may include one or more mating structures 52 on an interior portion and a first end 54. In addition, an end cap 50 may include one or more side walls 56 (the mating structures may be located on one or more side walls), and one or more cap portions 58 configured to at least partially block airflow into a huffer coupling (in particular, the port end 8 of a huffer coupling 2). The one or more mating structures 52 (which may include one or more internal threads) may be releasably mated with one or more mating structures 20 on the port end 8 of one or more huffer couplings 2 such that the end cap 50 (and even a flange assembly) is held in place with respect to the port end.

In some particular implementations, an end cap 50 may be integrated with one or more attachment members 38 and/or with other components defining a huffer coupling adapter described herein. By way of non-limiting example, a flange assembly 36 may include an attachment member 38 having an inside wall 46 with one or more mating structures (such as threads) configured to mate with one or more mating structures 20 on the port end 8 of the huffer coupling 2, such that the flange assembly 36 is held in place with respect to the huffer coupling 2 without the requirement of a separate end cap. In this example, the attachment member 36 includes an "integrated" end cap, and may even include one or more cap members (not shown) configured to block airflow from entering the port end 8 of a huffer coupling 2.

It will be understood that one or more attachment members, end caps, strut members and/or flange rings may be formed integrally with one another, and the arrangement of the various components may be configured and/or reconfigured according to the needs of a particular user and/or the demands of a particular application, consistent with these disclosures.

Referring specifically to FIG. 4, with at least one attachment member 38 attached to the port end 8 of an inner coupling 6, a flange assembly 36 may be held in place with respect to a huffer coupling 2 (and/or an adapted huffer coupling 35). It will be noted that a flange ring 40 defines an inner diameter 60. In some particular implementations, the inner diameter 60 of the flange ring 40 corresponds to the inner diameter of an aircraft air duct 24 and/or a ground air hose 22 (e.g. approximately 7.5 inches, and/or about 18.75 centimeters). In any event, the inner diameter 60 of the flange ring 40 will be larger than at least one outer diameter 14, such as outer diameter 14a and/or 14b, of the huffer coupling 2. In the particular implementation shown, the inner diameter 60 of the flange ring is larger than the outer diameter 14a of the huffer coupling 2.

Depending upon the particular manufacturer and/or model of huffer coupling, at least a portion of the huffer coupling 2 may pass into, or even through, the inner diameter 14 of the flange ring 40 when the flange assembly 36 is attached with the coupling 2. As shown in FIG. 4, the flange assembly 36 is attached to the huffer coupling 2 such that the port end 8 of the huffer coupling 2 passes into the inner diameter 60 of the flange ring 40. Passing at least a portion of the huffer coupling 2 into (and/or through) the inner diameter 14 of the flange ring 40 may include first passing either the attachment end 10 and/or the port end 8 into (and/or through) the flange ring 40.

With respect to any of the particular implementations of aircraft huffer coupling adapters disclosed herein, a huffer coupling 2 may be oriented concentrically with respect to the flange ring 40, meaning that the flange assembly 36 may be attached with a huffer coupling 2 such that an outside diameter 14 of the coupling 2 is concentrically located within the inner diameter 60 of the flange ring 40. As used herein, "concentrically" is intended to encompass at least those instances where an outer diameter 14 of the huffer coupling 2 is located within the boundaries of the inner diameter 60 of the flange ring 40. Notwithstanding, it will be further understood, as used herein the term "concentrically" does not require that the outer diameter 14 of the huffer coupling 2 and the inner diameter 60 of the flange ring 40 share a common centerpoint. Meaning, that the huffer coupling 2 does not necessarily have to be located centrally within the boundaries of the inner diameter 60 of the flange ring 40 (i.e. with the same centerpoint), just within the boundaries of the flange ring 40.

It will be understood that when any particular implementation of flange assembly disclosed herein is attached to a huffer coupling 2, there will exist one or more spaces 62 between an inner wall 64 of the flange ring 40 and at least one outer diameter 14 of the huffer coupling 2. As described further herein, the one or more spaces 62 are designed to allow airflow from a ground air hose 22 therethrough, such that conditioned air may be provided to one or more aircraft components and/or pack bays 80 in proximity to one or more aircraft huffer fittings 12.

Figure 7:
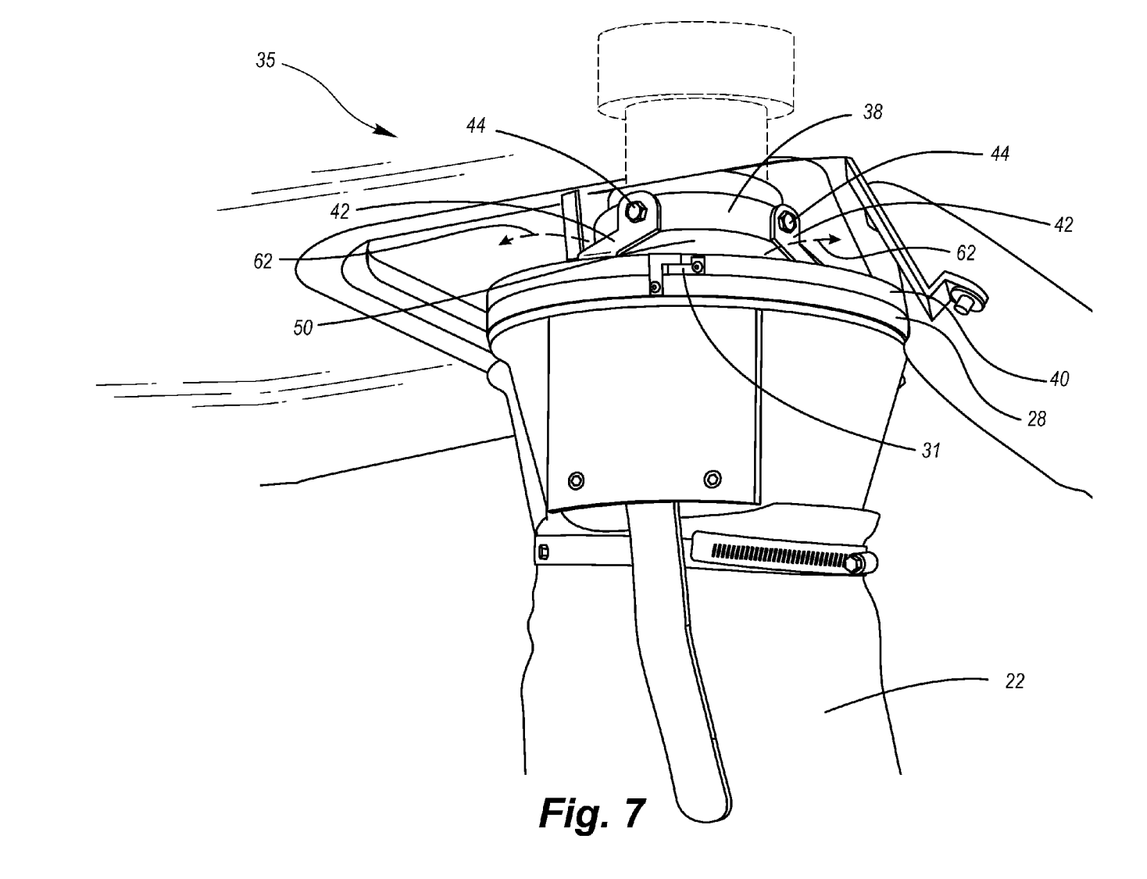
FIG. 7 illustrates an in-use view of the aircraft huffer coupling adapter shown with respect to FIGS. 3 and 4.
Figure 8A:
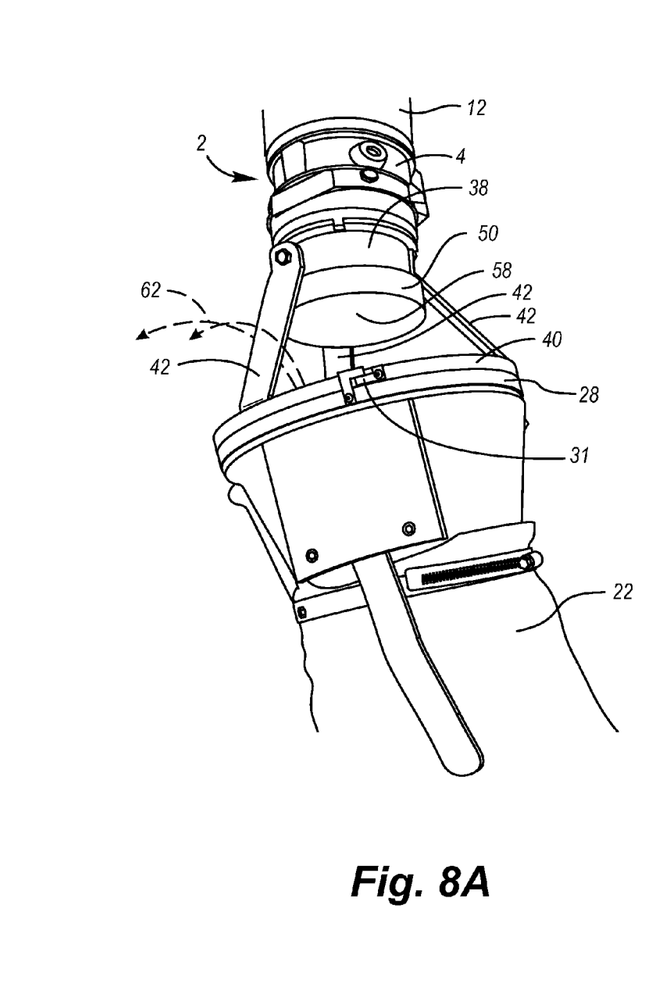
FIG. 8 illustrates in-use views of another particular implementation of an aircraft huffer coupling adapter.
Figure 8B:
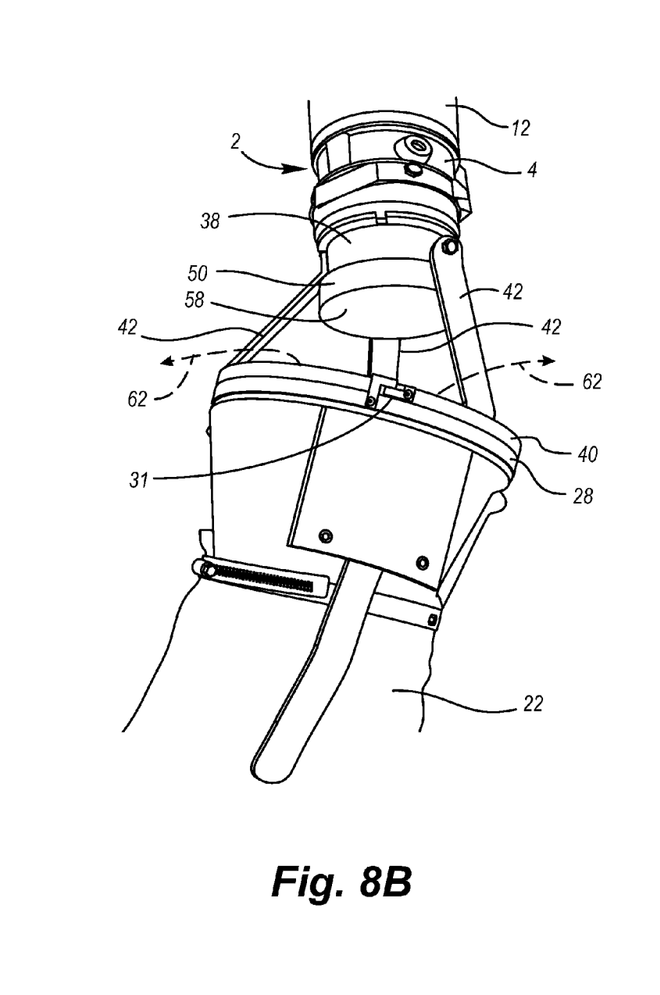
Figure 9:
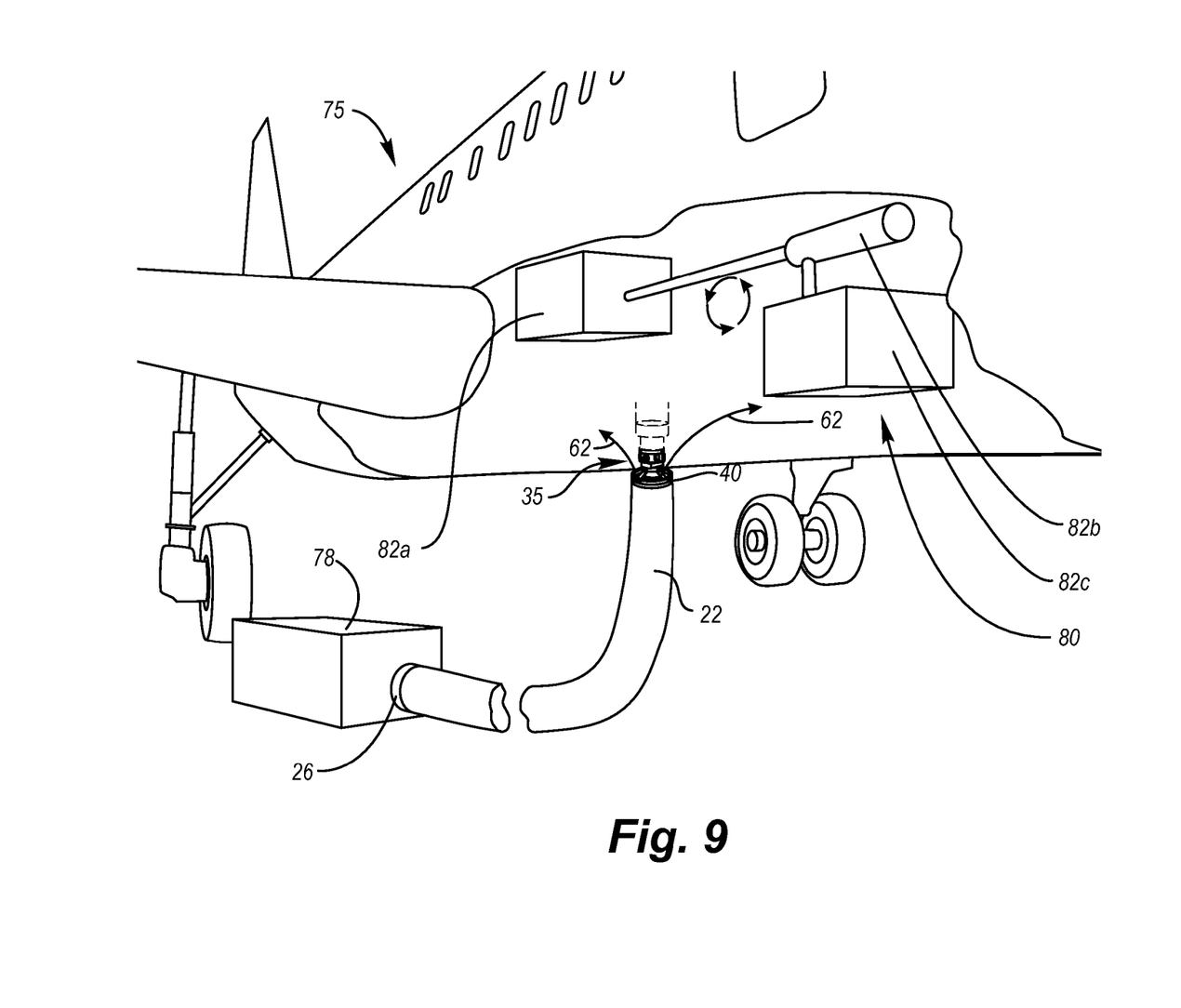
FIG. 9 illustrates an additional in-use view of a particular implementation of an aircraft huffer coupling adapter.

With the attachment of a distal end of a prior art ground air hose 22 to a flange ring 40 (such as via one or more connectors 31, and as shown by FIGS. 7-9), it will be understood that a huffer coupling adapter 34 is used at least to adapt or reconfigure a prior art huffer coupling 2 from being attachable with a conventional aircraft huffer hose 18 having a first diameter, to allowing attachment with one or more ground air hoses 22 having a second diameter, larger than the first diameter.

Figure 5:
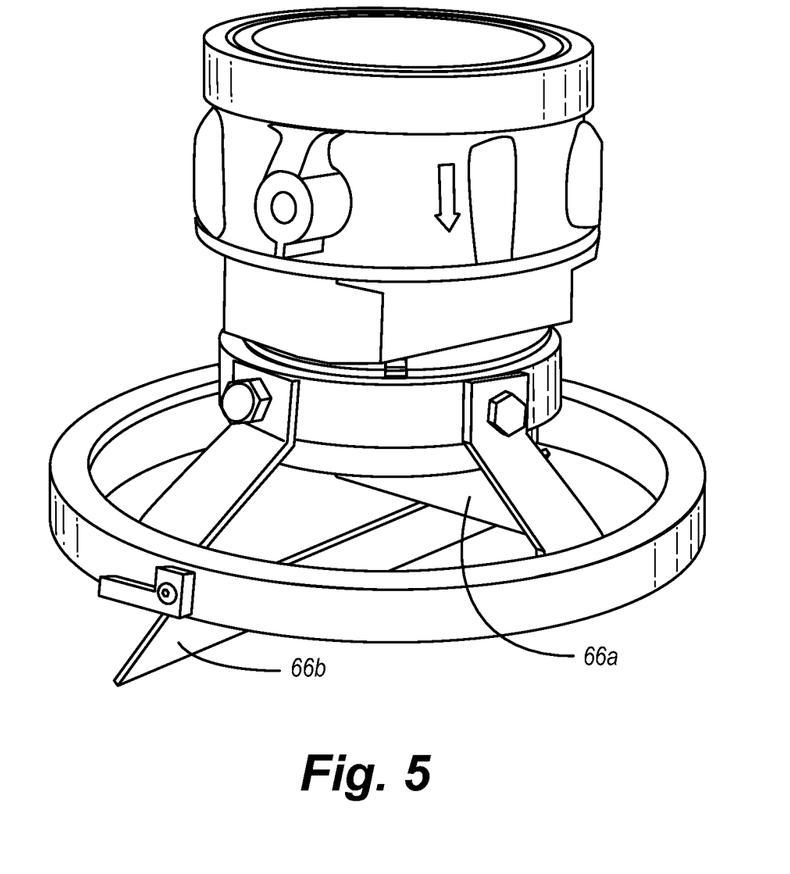
FIG. 5 illustrates a perspective view of a particular implementation of a huffer coupling adapter having one or more baffles.

Turning now to FIG. 5, another particular implementation of a huffer coupling adapter is illustrated. One or more components defining a huffer coupling adapter may be fitted with (and/or integrally formed with) one or more baffles 66 designed to deflect airflow in at least one direction (e.g. towards one or more pack bays 80 and/or pack bay components 82a-82n. For example, one or more end caps, flange rings, strut members, and/or attachment members may each include one or more baffles 66. Depending upon the particular implementation, one or more baffles 66 may be fixed, positionable and/or configurable according to the needs of a user and/or the demands of a particular application. For instance, in those cases where a huffer fitting 12 is located only on one side of an aircraft, one or more baffles may be provided to direct airflow towards the other side of the aircraft.

Figure 6:
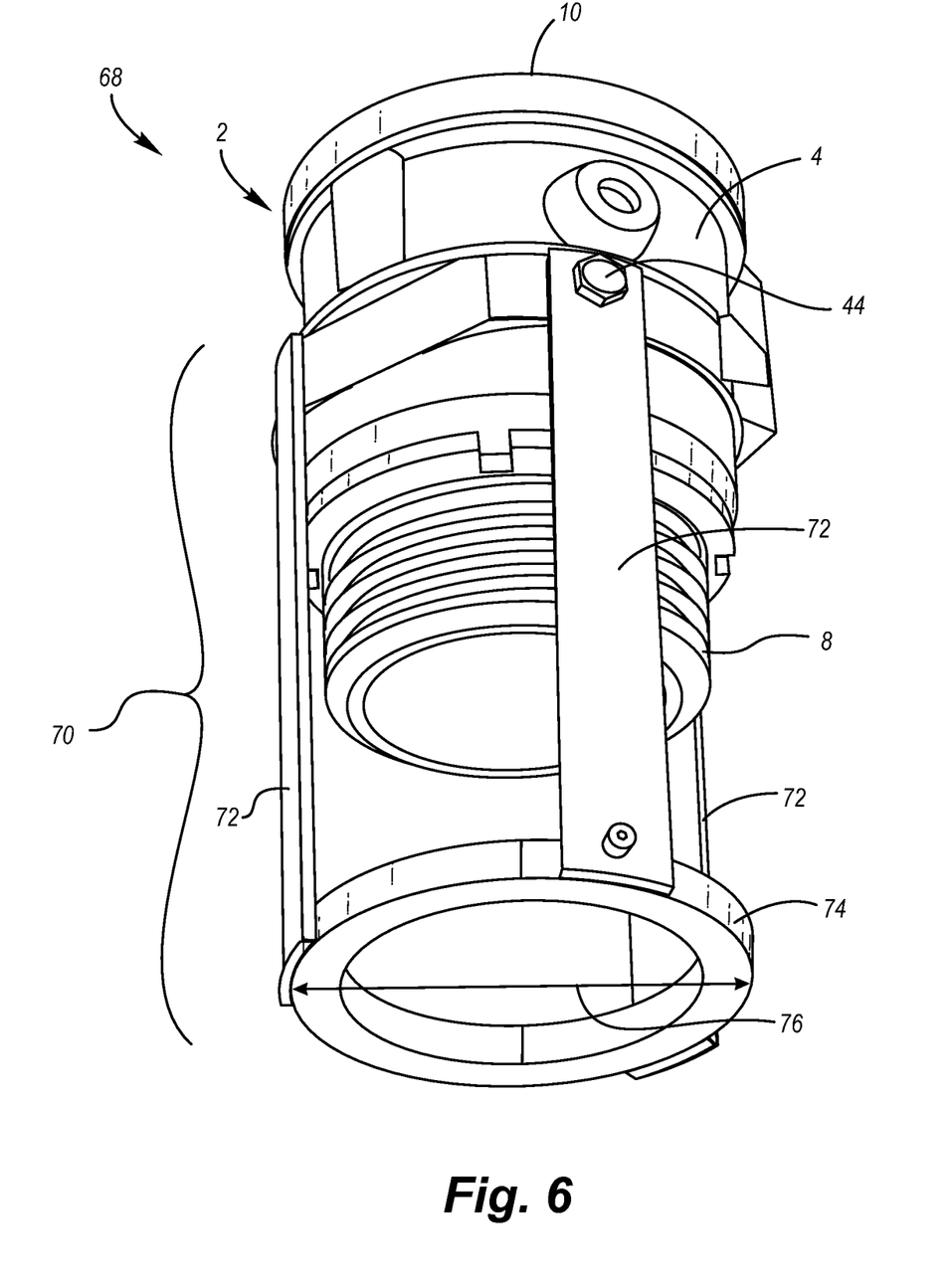
FIG. 6 illustrates a perspective view of an aircraft huffer coupling attached with a secondary flange assembly.

Referring now to FIG. 6, another particular implementation of a huffer coupling adapter is illustrated. As shown, an aircraft huffer coupling adapter 68 may include a huffer coupling 2 in conjunction with at least a secondary flange assembly 70 (which may be simultaneously used in conjunction with a flange assembly, and/or any other component described herein). A secondary flange assembly 70 includes at least one secondary attachment member 72 in communication (and/or attached and/or integrally formed with) with at least one secondary ring 74. Significantly, the secondary ring 74 has an outside diameter 76 smaller that the inner diameter 60 of the flange ring 40 (as well as the outside diameter of an end cap 50). As described further below, the secondary ring 74 may be used at least as a handle, and may further assist in preventing one or more end caps 50 from falling into a ground air hose 22, and/or for other uses.

Depending upon the particular implementation, a first end of one or more secondary attachment members 72 may be attached (such as with one or more fasteners) with the outer coupling 4 of the huffer coupling. A second end of the one or more secondary attachment members 72 may be attached with the secondary ring 74. In some particular implementations, one or more secondary attachment members 72 may be formed integrally with and/or made integral with one or more secondary rings 74.

Turning now to FIGS. 7-9, various particular implementations of huffer coupling adapters and associated methods of use are shown and described. FIG. 7 illustrates a huffer coupling 2 that has been adapted with a coupling adapter 34 (e.g. an adapted huffer coupling 35) and that has been attached with a huffer fitting (obscured in this view) of an aircraft 75. This figure further illustrates a distal end 28 of a ground air hose 22 attached with the flange ring 40 of the adapted coupling 35. It will be understood that in this configuration, a conventional huffer coupling 2 (ordinarily configured for attachment with a huffer hose 18) has been adapted with a flange assembly 36 to allow at least attachment of a ground air hose 22 thereto. In this manner, it will be appreciated that conditioned air from the ground air hose 22 (provided via one or more air conditioning units 78 coupled to the proximal end 26 of the ground air hose 22) may flow via one or more spaces 62 in proximity to one or more pack bays 80 and/or pack bay components 82 located near one or more huffer fittings 12 (FIG. 9).

By providing pre-conditioned air to one or more pack bays 80 and/or pack bay components 82 via an adapted huffer coupling (such as adapted coupling 35), one or more pack bay components 82a-82n, individually and/or collectively, may be allowed to provide efficient cooling, which may assist in avoiding and/or ameliorating one or more excessive heat conditions and/or alerts. As noted above, conditioned airflow may be at least partially blocked from entering a huffer coupling 2 at least by the presence of one or more end caps 50 (and/or cap members).

Referring specifically to FIG. 8, it will be understood that one or more components defining a flange assembly and/or a huffer coupling adapter (such as one or more strut members, attachment members and/or flange rings) may be provided in various lengths, widths, shapes, and/or other dimensions in order to allow for various configurations, tolerances and/or clearances with respect to a huffer coupling 2 (such as an outer diameter 14). By way of non-limiting example, in those particular implementations of aircraft huffer coupling adapters having two or more strut members 42 (such as the particular implementations shown in FIGS. 3-4 and/or 7-9), one or more of the two or more strut members 42 may be provided shorter than one or more other strut members such that a flange ring 40 in communication with the two or more attachment members is held in place obliquely with respect to a huffer coupling 2 (as shown in FIGS. 8a and 8b).

Notwithstanding, by way of non-limiting example, in those particular implementations having a single attachment member, the single attachment member may be likewise configured in various lengths, widths, shapes, angles, and/or other dimensions for similar purposes. Whether one or more attachment member are provided with respect to a particular implementation of coupling adapter disclosed herein, one or more components defining a particular implementation of a flange assembly and/or a huffer coupling adapter disclosed herein may likewise be provided in various configurations, such as fixed and/or pivotable, rotatable, flexible, and/or otherwise positionable with respect to one or more flange rings 40 and/or huffer couplings 2.

A comparison of FIG. 8a to FIG. 8b illustrates that a flange ring 40 may be positionable with respect to a huffer coupling 2, whether through adjustment of the flange ring, adjustment of one or more strut members and/or adjustment of one or more attachment members. It will be understood that by allowing one or more attachment members, strut members, end caps, and/or flange rings to be positionable with respect to one or more huffer couplings 2, and/or one or more other components disclosed herein, a user may be able to direct and/or deflect conditioned airflow through a flange ring 40 (and through one or more spaces 62) in a manner determined by a user to be best suited to the needs of a particular application.

Turning now to FIG. 9, conditioned airflow that is forced out through the one or more spaces 62 located between the huffer coupling 2 and the flange ring 40 may flow and/or may be deflected (and/or directed) to one or more aircraft surfaces, such as one or walls, components and/or other elements defining one or more pack bays 80. By adapting a conventional huffer coupling 2 with a particular implementation of a flange assembly disclosed herein, the applicant has discovered that an adapted huffer coupling may be used to suspend one or more ground air hoses 22 in proximity to one or more pack bays 80. By providing conditioned airflow from a ground air hose 22 to an adapted huffer coupling 35 such that the conditioned airflow may be further processed by one or more pack bay components 82a-82n located in proximity to a huffer fitting 12, the applicant has discovered that the cooling efficiency of one or more pack bay components 82a-82n (individually and/or collectively) may be increased. The applicant has further discovered that by increasing the cooling efficiency of one or more pack bay components 82a-82n, one or more excessive heat conditions and/or alerts may desirably be prevented and/or ameliorated.

Those skilled in the art can appreciate from the foregoing descriptions that the present teachings can be implemented in a variety of forms and with tremendous flexibility. Therefore, while these teachings have been described in connection with particular embodiments and examples thereof, the true scope of the present teachings should not be so limited. Various changes and modifications may be made without departing from the scope of the teachings herein. In addition, it will be understood that with respect to any of the methods disclosed herein, one or more steps may be performed in any order, without regard to order of operation. It will be further understood that additional method steps may be included according to the disclosures contained herein, as well as the needs of one or more particular users and/or applications.

The invention claimed is:

1. A method for cooling the pack bays of an aircraft by adapting an aircraft huffer coupling for attachment with a ground air hose, the method comprising:
   attaching an adapter to a port end of an aircraft huffer coupling via an attachment member of the adapter;
   attaching a ground air hose to a flange ring of the adapter;
   attaching the aircraft huffer coupling to a huffer fitting on a jet aircraft;
   providing airflow to an inside portion of a ground air hose from one or more huffers;
   directing at least a substantial portion of the airflow to an area of the jet aircraft away from the aircraft huffer coupling via at least one opening between the attachment member and the flange ring.

2. The method of claim 1, wherein attaching the adapter to the port end of the aircraft huffer coupling comprises releasably mating one or more mating structures on an inside wall of the attachment member with one or more mating structures on the port end of the aircraft huffer coupling.

3. The method of claim 1, wherein attaching the adapter to the port end of the aircraft huffer coupling comprises releasably mating an end cap with one or more mating structures on the port end of the aircraft huffer coupling such that the end cap is in mechanical communication with the attachment member and the adapter is substantially held in place with respect to the aircraft huffer coupling.

4. The method of claim 1, further comprising at least partially blocking the airflow from entering the aircraft huffer coupling.

5. The method of claim 1, wherein directing the airflow comprises deflecting the airflow with one or more baffles.

6. The method of claim 1, further comprising positioning the flange ring with respect to the huffer coupling.

7. The method of claim 1, wherein providing airflow to the inside portion of the ground air hose comprises providing conditioned airflow.

8. The method of claim 1, wherein the area of the jet aircraft comprises pack bays of the jet aircraft.

* * * * *